Patented Aug. 29, 1950

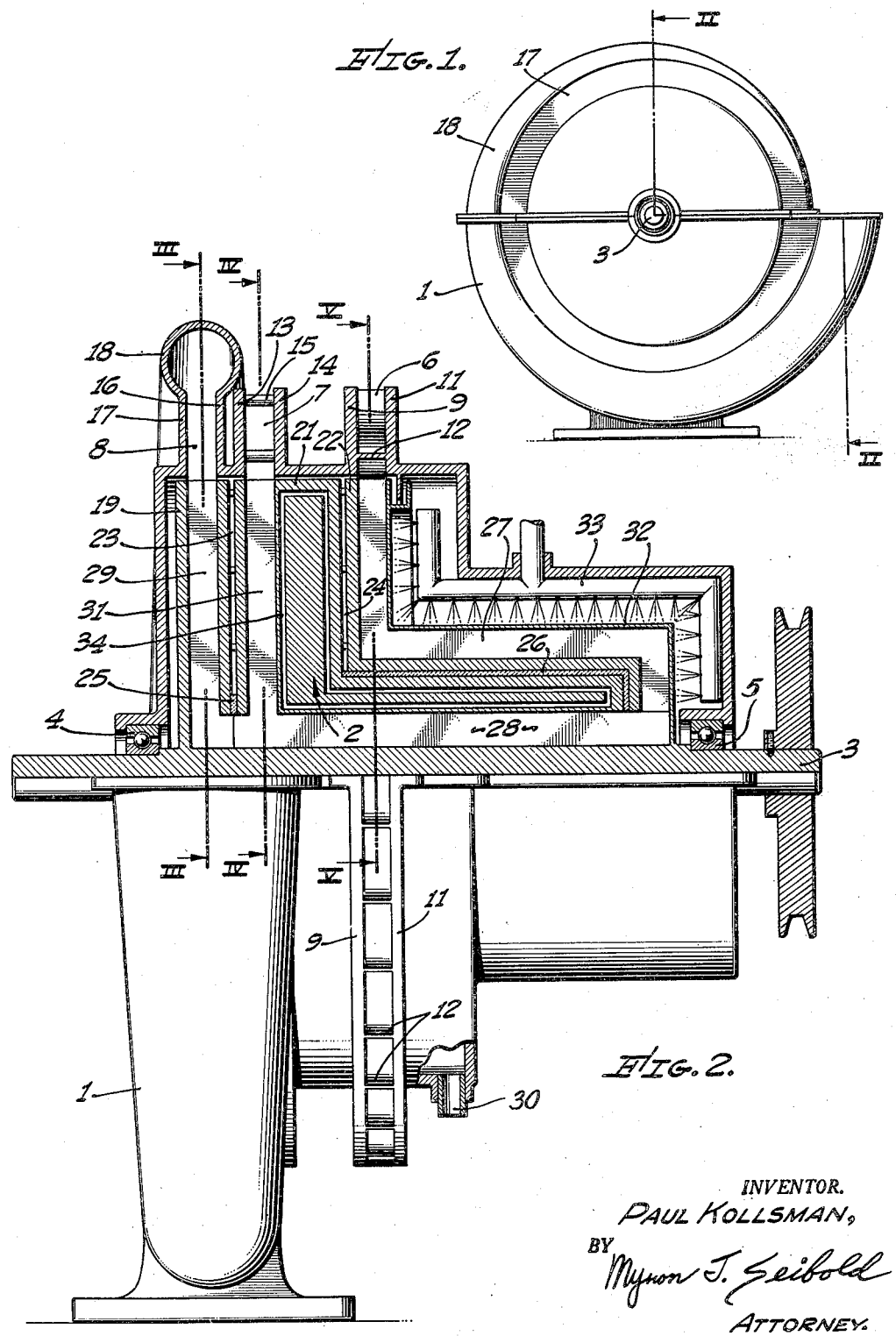

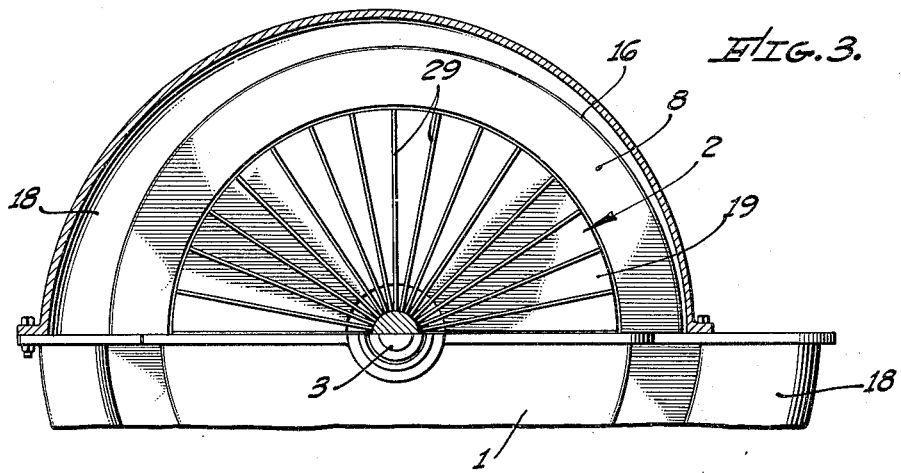
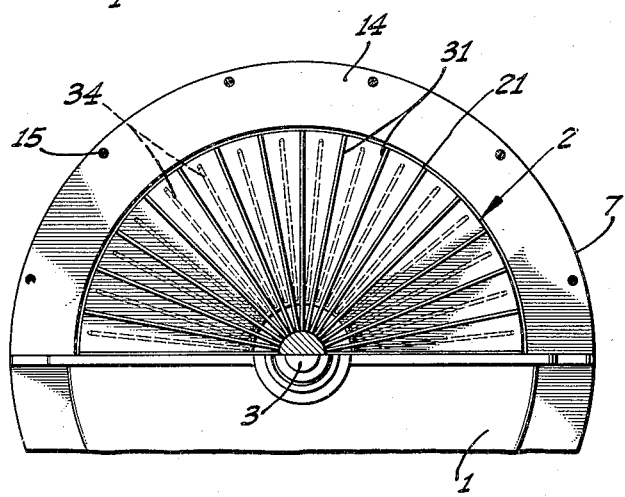
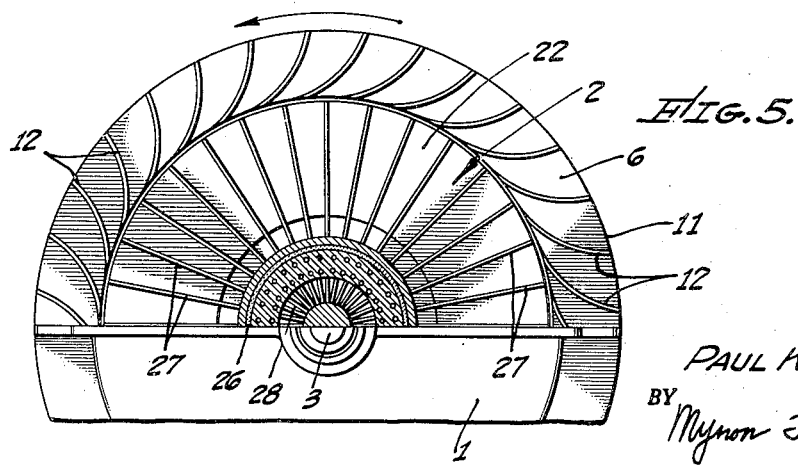

2,520,729

UNITED STATES PATENT OFFICE 2,520,729

MACHINE FOR PRODUCING HEAT ENERGY

Paul Kollsman, New York, N. Y.

Application August 27, 1945, Serial No. 612,956

8 Claims. (Cl. 257—244)

This invention relates to a rotary machine for converting mechanical or electrical energy into heat.

One object of the invention is the provision of a rotary machine for passing a gas through an expansion, compression cycle with heat supplied to the gas in its expansion cycle.

Another object of the invention is a rotary machine having a plurality of radially extending gas passages in which a flow of gas is secured from the periphery of the machine toward the axis and return, in which the gas passing toward the axis, undergoing expansion, is maintained at a substantially constant temperature.

Another object of the invention is a machine in accordance with the preceding objects in which the heat energy of a portion of the gas is utilized to increase the temperature and energy of the remaining portion.

Other objects and features of the invention will be readily apparent to those skilled in the art from the specification and appended drawing illustrating certain preferred embodiments in which:

Figure 1 is an end elevational view of the machine according to the present invention.

Figure 2 is a partial vertical sectional view through the machine with the lower portion shown in elevation.

Figure 3 is a partial sectional view on the line III—III of Figure 2.

Figure 4 is a partial sectional view on the line IV—IV of Figure 2.

Figure 5 is a partial sectional view on the line V—V of Figure 2.

The machine as specifically illustrated in the drawings comprises an outer casing 1 within which is disposed a rotor indicated generally at 2 mounted upon a shaft 3 supported within the casings in bearings 4 and 5. The periphery of the casing 1 is provided with three annular openings 6, 7, and 8 for the passage of air or other gas upon which the machine is operating.

The opening 6 is formed by parallel annular walls 9 and 11 between which are disposed directional vanes 12 serving to direct the incoming gas or air in a direction with a substantial tangential component. The opening 7 is formed by parallel annular walls 13 and 14 structurally joined by the spaced pins 15 and forming a diffuser passage for the air discharging therethrough. The opening 8 is in the form of a diffuser passage between parallel annular walls 16 and 17 and the diffuser passage 8 leads into a spiral collector 18 for the heated gas.

Rotor 2 is formed of three sections 19, 21, and 22 which are joined together in spaced relation to provide insulating air spaces 23 and 24 between the sections to inhibit heat transfer therebetween. Adjacent to the axis of the machine the spaces 23 and 24 are filled with solid insulating seals 25 and 26 to prevent the passage of air through the insulating space.

Within the rotor sections 19, 21, and 22 there are provided a plurality of individual gas passages or chambers spaced circumferentially about the rotor. These passages may be formed in any desired manner but are illustrated as formed by fins extending between the walls of the rotor sections. As shown in Figure 2 these comprise radially and axially extending fins 27, axially extending fins 28 and radially extending fins 29 and 31 forming gas passages leading from the periphery of the rotor toward the axis and again toward the periphery. While the fins 27 have an axial extension to secure a greater heat exchange area to insure the maintenance of the expanding gas at normal temperature, the resultant passages or gas flow may be considered to be of generally U-shape with the bight of the U adjacent to the axis of rotation and the legs extending radially toward the periphery. The axially extending portions of the fins 27 and 28 have no function in the expansion and compression cycle but serve to provide extended surfaces for heat exchange.

The wall 32 of rotor section 22 which bounds the gas passages at the fins 27 is shown as being relatively thin to facilitate heat exchange, and this wall is preferably formed of a material effecting heat transfer with high efficiency. Within the casing 1 adjacent to wall 32 is provided a heater 33 shown as a water spray contacting the wall 32 to maintain the gas in the passages between fins 27 at normal temperature during its expansion cycle. While referred to as a heater the member 33 may be utilized to spray water at normal temperatures to maintain the air between fins 27 at room temperature during the expansion cycle. Water from heater 33 is drained from the casing 1 through the outlet opening 30.

Within the rotor section 21, there are provided a plurality of closed passageways 34 circumferentially spaced about the rotor and filled with water or other liquid which will circulate to provide heat transfer to the gas in the passage between the fins 28.

In the operation of the machine the shaft 3 is rotated by any exterior source of power and water or other heating medium is sprayed from the heater 33 into contact with the wall 32. Air or other gas entering the annular opening 6 will be deflected by the vanes 12 in a direction having a substantial tangential velocity to facilitate its entrance between the fins 27. As the air travels toward the axis of the machine it will undergo expansion due to the action of centrifugal force on the columns of air in the radial portions of the passages which tends to produce a vacuum adjacent to the rotary axis in the machine. In this expansion the temperature of the air is maintained by heat transfer through the surface 32 so that the expanded air reaches the axis of the machine at substantially intake temperature. The air passes through the passages between the fins 28 and is discharged from the machine through the passages between the fins 29 and 31 into the diffuser passages 8 and 7, respectively. This flow of air through the machine is maintained by the action of centrifugal force on the rotating air in the diffuser openings 8 and 7 wherein the rotational energy of the discharged air serves to draw the air from the passages as the air in the diffuser moves to a greater radius of rotation with its rotational energy converted into pressure energy.

As so far described the machine could be utilized without the passages between the fins 31 and the heat transfer passageways 34 to produce an increased temperature and energy in the air or gas delivered to collector 18. The function of the passages between the fins 31 and of liquid circulating passages 34 is to further increase the temperature of the collected air but at the expense of the volume delivered. The gas passing through the passages between the fins 31 and discharging through the diffuser 7 will, as it is compressed, heat the liquid in the radial leg of passageway 34, upon the left as viewed in Figure 2. As the density of this leg becomes less than the density of the right hand radial leg, in view of its increased temperature, a circulating flow, counter clockwise as viewed in Figure 2 will take place with the heated liquid, serving to heat the expanded gas in the passages between the fins 28. The result is that the gas entering the passages between the fins 29 will in its expanded state, be at an initially higher temperature in its expanded state so that the recompressed gas passing through diffuser 8 into the collector spiral 18 will be at a higher final temperature. The proportioning of the relative sizes of the passages between the fins 29 and 31 will determine the volume and temperature of the gas directed to the collector ring 18; omission of the passages between the fins 31 providing the maximum of air but at a lower temperature.

While the passages in the rotor have been referred to in the specification and claims as being radial it is understood that they may extend in any desired direction from the axis toward the periphery of the rotor.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a machine of the class described, a rotary member, means providing gas passages in said member having a plurality of substantially radially extending legs and a connecting portion adjacent to the axis of said member, means providing a gas inlet at the peripheral end of one of said radial legs, means providing gas outlets at the peripheral ends of at least two other of said radial legs, said radial legs being substantially long so that the gas therein is at a progressively substantially lower pressure toward the axis of said member due to the action of centrifugal force on the columns of gas in the radial legs, means for heating the gas in the inlet leg as it expands toward the axis of the member, the gas in said outlet legs being recompressed as it moves toward the periphery of the member, a continuous passageway having legs disposed adjacent to one of said outlet legs and adjacent to the connecting portion, a liquid in said passageway adapted to be heated by the gas in said one of said outlet legs and to transfer the heat to the expanded gas in the connecting portion, and means for collecting the heated gas delivered from the other of said outlet legs.

2. In a machine of the class described, a rotary member, means providing gas passages in said member having a plurality of substantially radially extending legs and a connecting portion adjacent to the axis of said member, means providing a gas inlet at the peripheral end of one of said radial legs, means providing gas outlets at the peripheral ends of at least two other of said radial legs, said radial legs being sufficiently long so that the gas therein is at a progressively substantially lower pressure toward the axis of said member due to the action of centrifugal force on the columns of gas in the radial legs, means for heating the gas in the inlet leg as it expands toward the axis of the member, the gas in said outlet legs being recompressed as it moves toward the periphery of the member, a continuous passageway having legs disposed adjacent to one of said outlet legs and adjacent to the connecting portion, a liquid in said passageway adapted to be heated by the gas in said one of said outlet legs and to transfer the heat to the expanded gas in the connecting portion, and means for collecting the heated gas delivered from the other of said outlet legs, said gas inlet means including vanes directing the incoming gas in a direction having a substantial tangential component.

3. In a machine of the class described, a rotary member, means providing a plurality of gas passages in said member spaced circumferentially about said member, each of said passages comprising a plurality of substantially radially extending legs and a connecting portion adjacent to the axis of said member, means providing a gas inlet adjacent to the peripheral ends of one set of said radial legs, means for heating the gas in said one set of radial legs, means providing gas outlets at the peripheral ends of at least two other sets of radial legs, said radial legs being sufficiently long so that the gas adjacent said connecting portions is substantially expanded due to the action of centrifugal force on the gas columns in the radial legs, means for effecting gas flow through said passages from said inlets to said outlets, means for collecting hot gas delivered from one set of said outlet legs, and means for transferring the heat energy of the gas in the other set of outlet legs to the expanded gas adjacent to the axis of the member.

4. In a machine of the class described, a rotary member, means providing a plurality of gas passages in said member spaced circumferentially about said member, each of said passages comprising a plurality of substantially radially extending legs and a connecting portion adjacent to the axis of said member, means providing a gas inlet adjacent to the peripheral ends of one set of said radial legs, means for heating the gas in said one set of radial legs, means providing gas outlets adjacent to the peripheral ends of at least two other sets of radial legs, said radial legs being sufficiently long so that the gas adjacent said connecting portions is substantially expanded due to the action of centrifugal force on the gas columns in the radial legs, means for effecting gas flow through said passages from said inlets to said outlets, means for collecting hot gas delivered from one set of said outlet legs, and means for transferring the heat energy of the gas in the other set of outlet legs to the expanded gas adjacent to the axis of the member, said last mentioned means comprising a heat transfer medium circulating in heat transfer relation with the gas in said other set of outlet legs and with the expanded gas adjacent to the axis of the rotary member.

5. In a machine of the class described, a rotary member, means providing a plurality of gas passages in said member spaced circumferentially about said member, each of said passages comprising a plurality of substantially radially extending legs and a connecting portion adjacent to the axis of said member, means providing a gas inlet adjacent to the peripheral ends of one set of said radial legs, means for heating the gas in said one set of radial legs, means providing gas outlets adjacent to the peripheral ends of at least two other sets of radial legs, said radial legs being sufficiently long so that the gas adjacent said connecting portions is substantially expanded due to the action of centrifugal force on the gas columns in the radial legs, means for collecting hot gas delivered from one set of said outlet legs, and means for transferring the heat energy of the gas in the other set of outlet legs to the expanded gas adjacent to the axis of the member, said outlets including annular diffusers in which the rotational energy of the discharged gas is converted to effect flow of gas through the passages.

6. A machine for producing heat energy and comprising, a stator; a rotor mounted on said stator for spinning about an axis, the rotor having a plurality of gas passages therein each passage comprising an entrance portion extending from the rotor periphery towards the axis, and an exit portion extending back toward the rotor periphery, gas flowing through said passages being centrifugally expanded within the entrance portions as the gas approaches the axis and being centrifugally recompressed within the exit portions as it approaches the periphery; means for heating the gas within the entrance portions for raising the temperature of the gas above the temperature it would otherwise assume due to its expansion, said heating means being separate and divorced from said exit portions; and means for providing flow of gas through said passages from said entrance portion to said exit portion, whereby the gas leaving the exit portion may be heated to a temperature higher than the temperature available at said heating means.

7. A machine for producing heat energy and comprising, a hollow stator; a rotor mounted within said stator for spinning about an axis, the rotor having a plurality of gas passages therein each passage comprising an entrance portion extending from the rotor periphery towards the axis, and an exit portion extending back toward the rotor periphery, gas flowing through said passages being centrifugally expanded within the entrance portions as the gas approaches the axis and being centrifugally recompressed within the exit portions as it approaches the periphery; means for heating the gas within the entrance portions for raising the temperature of the gas above the temperature it would otherwise assume due to its expansion, said heating means being separate and divorced from said exit portions; means on said stator for directing gas into the entrance portions of said passages; and a diffuser on said stator adjacent said exit portions for converting kinetic energy of the gas leaving the rotor into pressure energy and causing a flow of gas through said rotor passages from said entrance to said exit, whereby the gas leaving the machine may be heated to a temperature higher than the temperature available at said heating means.

8. A machine for producing heat energy and comprising, a stationary housing; a rotor mounted within said housing for spinning about an axis, the rotor having a plurality of gas passages therein each passage comprising an entrance portion extending from the rotor periphery towards the axis, a connecting portion extending from the entrance portion substantially along the axis, and an exit portion extending from the connection portion toward the rotor periphery, gas flowing through said passages being centrifugally expanded within the entrance portions as the gas approaches the axis and being centrifugally recompressed within the exit portions as it approaches the periphery; means for heating the gas within the entrance portions for raising the temperature of the gas above the temperature it would otherwise assume due to its expansion, said heating means being separate and divorced from said exit portions; means in said housing for directing gas into the entrance portions of said passages; and means for providing flow of gas through said passages from said entrance portion to said exit portion, said flow providing means including a diffuser in said housing in registry with said exit portions for converting kinetic energy of the gas leaving the rotor into pressure energy and causing a flow of gas through said rotor passages from said entrance to said exit, whereby the gas leaving the machine may be heated to a temperature higher than the temperature available at said heating means.

PAUL KOLLSMAN.

REFERENCES CITED

The following references are of record in the file of this patent:

UNITED STATES PATENTS

| Number | Name | Date |
| --- | --- | --- |
| 1,265,650 | Graemiger | May 7, 1918 |
| 1,540,886 | Huff | June 9, 1925 |
| 1,906,370 | Darrow | May 2, 1933 |
| 1,965,733 | Chamberlain | July 10, 1934 |
| 2,088,734 | Duran | Aug. 3, 1937 |
| 2,332,969 | Higley | Oct. 26, 1943 |

FOREIGN PATENTS

| Number | Country | Date |
| --- | --- | --- |
| 682,261 | France | May 26, 1930 |

Certificate of Correction

Patent No. 2,520,729                                                              August 29, 1950

PAUL KOLLSMAN

It is hereby certified that error appears in the printed specification of the above numbered patent requiring correction as follows:

Column 4, lines 5 and 6, for the word "substantially" read *sufficiently*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*